(12) United States Patent
Marathe et al.

(10) Patent No.: US 8,457,616 B2
(45) Date of Patent: Jun. 4, 2013

(54) METHOD AND APPARATUS FOR BACKUP COMMUNICATION SERVICES

(75) Inventors: Nikhil Marathe, Chicago, IL (US); Randal D. Biederstedt, Indianapolis, IN (US); Juan Nunez, Plainfield, IL (US); Shadi Khoshaba, Skokie, IL (US); Paula D. Adams, Chicago, IL (US)

(73) Assignee: AT&T Intellectual Property I, LP, Atlanta, GA (US)

( * ) Notice: Subject to any disclaimer, the term of this patent is extended or adjusted under 35 U.S.C. 154(b) by 1345 days.

(21) Appl. No.: 11/426,496

(22) Filed: Jun. 26, 2006

(65) Prior Publication Data
US 2007/0298755 A1    Dec. 27, 2007

(51) Int. Cl.
*H04M 3/00* (2006.01)

(52) U.S. Cl.
USPC ...... 455/418; 455/423; 455/426.1; 455/404.1

(58) Field of Classification Search
USPC .............................. 455/418, 423, 426.1, 404.1
See application file for complete search history.

(56) References Cited

U.S. PATENT DOCUMENTS

| 5,737,703 A * | 4/1998 | Byrne ........................... 455/442 |
| 6,411,802 B1 * | 6/2002 | Cardina et al. ................. 455/424 |
| 7,035,633 B2 * | 4/2006 | Kirkpatrick ................. 455/426.1 |
| 7,212,506 B2 * | 5/2007 | Varney et al. ................. 370/329 |
| 2004/0033786 A1 | 2/2004 | Kirkpatrick |

* cited by examiner

*Primary Examiner* — Nghi H Ly
(74) *Attorney, Agent, or Firm* — Guntin & Gust, PLLC; Andrew Gust

(57) ABSTRACT

A method and apparatus is disclosed for backup communication services. An apparatus that incorporates teachings of the present disclosure may include, for example, a wireless interface having a detection module to detect an interruption in a portion of communication services supplied to a plurality of residences by a central office over communication lines coupled to a cross-connect operating in a service area interface (SAI), and a controller module to direct a wireless transceiver to establish communications with a wireless station in response to the interruption, and to direct the cross-connect to provide communication services to a portion of the plurality of residences affected by the interruption by way of the wireless transceiver. Additional embodiments are disclosed.

20 Claims, 3 Drawing Sheets

100

110

METHOD AND APPARATUS FOR BACKUP COMMUNICATION SERVICES

FIELD OF THE DISCLOSURE

The present disclosure relates generally to communication services, and more specifically to a method and apparatus for backup communication services.

BACKGROUND

As communication networks continue to grow at a rapid pace, substantial network expansion is taking place to expand the bandwidth capacity supplied to residences and commercial enterprises. In the course of network construction or maintenance thereof it is common for inadvertent outages to occur due to an accidental break in one or more communication links.

These outages can be very costly to commercial enterprises and can be an annoyance to consumers. If outages are too frequent, businesses and consumers can choose to subscribe to services from competing service providers. Moreover, outages can be dangerous during emergency situations warranting rapid response.

A need therefore arises for a method and apparatus for backup communication services.

DETAILED DESCRIPTION

Embodiments in accordance with the present disclosure provide a method and apparatus for backup communication services.

In a first embodiment of the present disclosure, a wireless interface can have a detection module to detect an interruption in a portion of communication services supplied to a plurality of residences by a central office over communication lines coupled to a cross-connect operating in a service area interface (SAI), and a controller module to direct a wireless transceiver to establish communications with a wireless station in response to the interruption, and to direct the cross-connect to provide communication services to a portion of the plurality of residences affected by the interruption by way of the wireless transceiver.

In a second embodiment of the present disclosure, a computer-readable storage medium in a wireless interface can operate in a service area interface (SAI) with computer instructions for detecting an interruption in a portion of communication services supplied by a central office coupled to a cross-connect of the SAI to a plurality of establishments, and directing the cross-connect to provide communication services to a portion of the plurality of establishments affected by the interruption by way of a wireless transceiver supplying backup communication services by way of a wireless communication system.

In a third embodiment of the present disclosure, a service area interface (SAI) can have a cross-connect coupled to a central office and a plurality of buildings, a wireless transceiver coupled to the cross-connect to supply backup communication services by way of a wireless station, a detection module to detect an interruption in communication services supplied by the central office to the plurality of buildings by way of the cross-connect, and a controller module to direct the wireless transceiver to establish communications with the wireless station in response to the interruption, and direct the cross-connect to redirect communications associated with a portion of the plurality of buildings affected by the interruption to the wireless transceiver.

Figure 1:
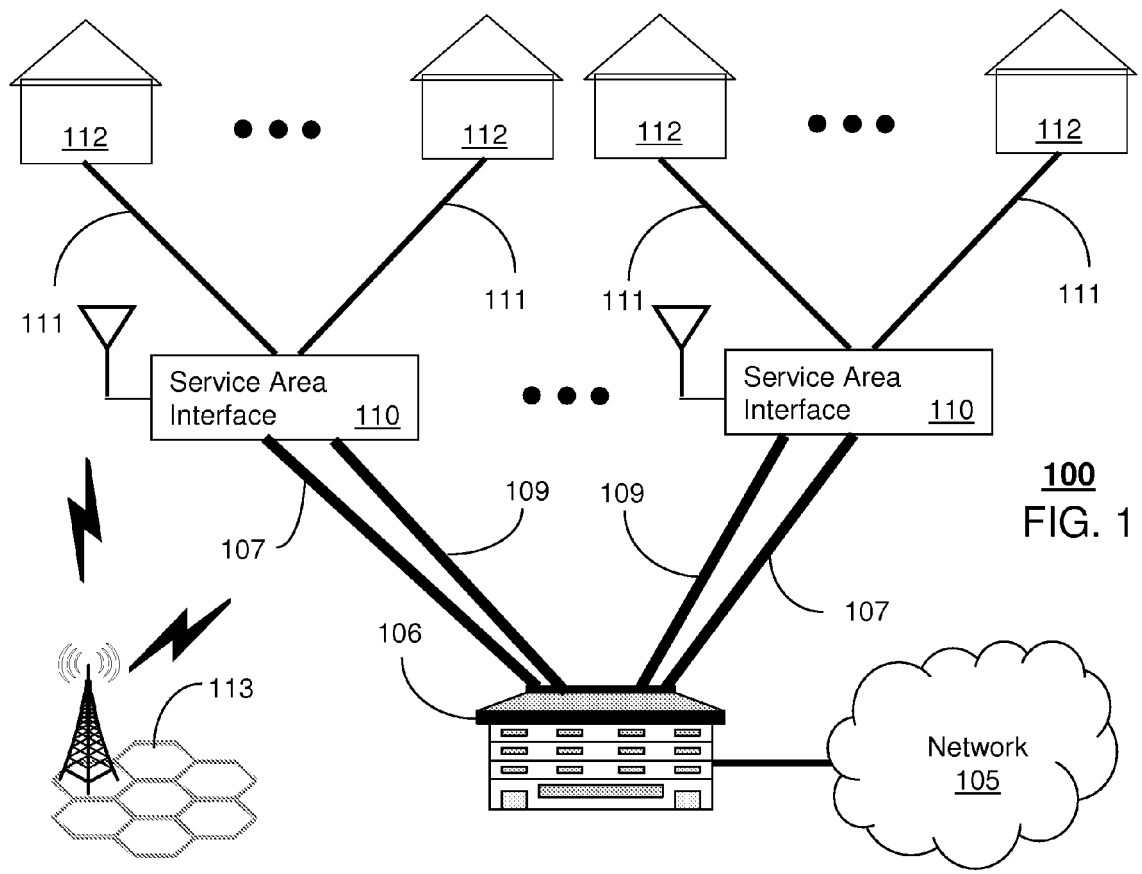
FIG. 1 depicts an exemplary block diagram of a communication system.

FIG. 1 depicts an exemplary block diagram of a communication system 100. The communication system 100 comprises a central office (CO) 106 and a plurality of service area interfaces (SAIs) 110 each coupled to a plurality of buildings 112. The CO 106 houses common network switching equipment for distributing local and long-distance telecommunication services supplied by network 105 to buildings 112 (such as dwellings or commercial enterprises) by way of the distribution systems 110. For illustration purposes only, buildings 112 will be referred to herein as residences 112. Telecommunication services of the CO 106 can include traditional POTS (Plain Old Telephone Service) and broadband services such as HDTV, DSL, VoIP (Voice over Internet Protocol), IPTV (Internet Protocol Television), Internet services, and so on.

Links 107 can be twisted copper pairs for distributing power to the SAIs 110. Alternatively, links 107 can be coupled to local commercial power near the SAIs 110 supplied by, for example, a utility company. The SAI 110 can be coupled to optical and/or electrical cables 109 supplied by the CO 106, which carries any one or more of the aforementioned communications services. These services can be processed in part by active circuits in the SAI 106 and/or circuits at the residences 112. Each cable 109 carries communication lines numbering in the tens or hundreds. The SAI 110 serves to distribute portions of the cables 109 among the residences 112 as dedicated communication links 111. Thus, the SAI 110 serves as a local cross-connect system for unbundling communication lines in cable 109.

Figure 2:
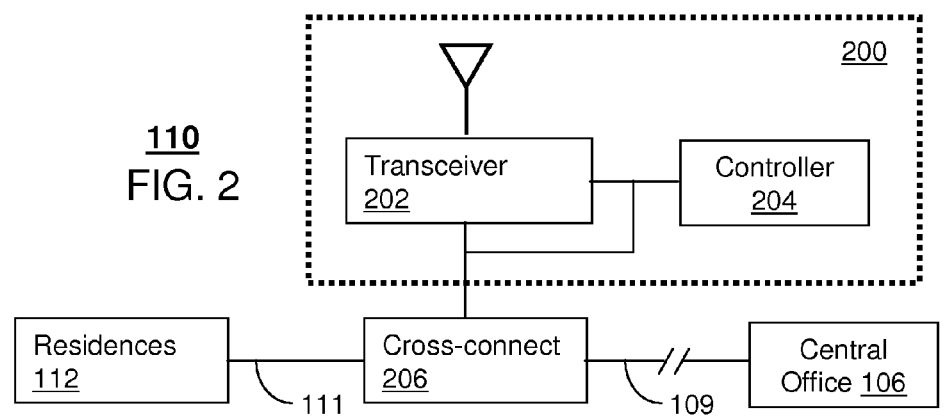
FIG. 2 depicts an exemplary block diagram of a wireless interface operating in a service area interface (SAI) of the communication system.

FIG. 2 depicts an exemplary block diagram of a wireless interface 200 operating in an SAI 110 of the communication system 100. The wireless interface 200 includes a wireless transceiver 202, and a controller 204 that manages operations of the wireless transceiver 202. The wireless transceiver 202 can be used for interfacing to a wireless station 113 when an interruption is detected in the communication services provided by the CO 106 to the residences 112. The interruption can be caused by any number of reasons including maintenance operation in the SAI 110, or an inadvertent break in a portion of the cable 109 due to for example field engineers performing cable maintenance, repair/splicing, or additions.

The wireless station 113 can represent a cellular base station, WiMax or software defined radio (SDR) communication node, which provides backup communication services to the residences 112 during a communication outage with the CO 106. In the case of a cellular base station, said station can support for example GSM, CDMA, UMTS or other present or next generation wireless communication protocols. The controller 204 utilizes common computing technology such as a microprocessor, a digital signal processor (DSP), or a custom ASIC (Application Specific Integrated Circuit) state machine. The controller 204 can have internal or external storage media such as a RAM, SRAM, Flash, or other common storage element(s).

As shown in FIG. 2, the transceiver 202 and controller 204 interfaces to a cross-connect system 206 of the SAI 110. The cross-connect 206 can include a common multiplexer (not shown). Under the direction of the controller 204, the multiplexer can serve to multiplex links 111 from the residences 112 to one among the wireless transceiver 202 and the cables 109 of the CO 106 depending on the state of operations monitored by the controller 204.

Figure 3:
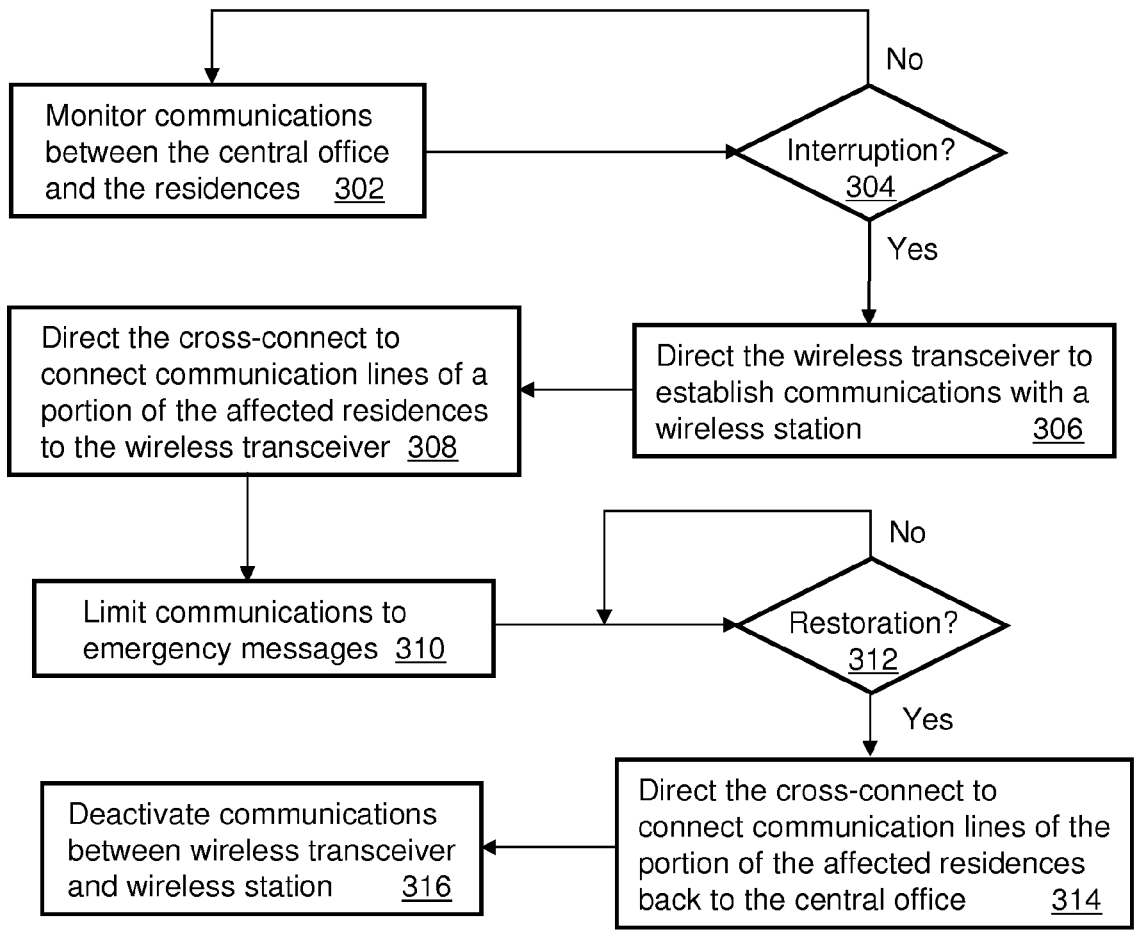
FIG. 3 depicts an exemplary method operating in the communication system.

FIG. 3 depicts an exemplary method 300 operating in the communication system 100. Method 300 begins with step 302 in which the controller 204 of each SAI 110 can be programmed to monitor communications between the CO 106 and the residences 112. In this step, the controller 204 checks for any anomalous behavior in the communication stream between the CO 106 and the residences 112. In its simplest form, an anomalous behavior can include a complete outage of a portion or all of the services provided by the communication lines in cable 109. In a more complex embodiment, the controller 204 can also monitor for quality of service criteria such as signal to noise ratio, bit error rate, packet losses, analog signal quality, and so on. The controller 204 monitors the quality of the communication lines from the ingress and/or egress point of the cross-connect 206 (i.e., cable 109 or link 111).

If the controller 204 does not identify in step 304 a substantive interruption in communication services to the residences 112, the cross-connect 206 continues normal operations by supplying communication services to the residences 112 by way of the CO 106. If on the other an interruption is detected in step 304, the controller 204 proceeds to step 306 where it directs the wireless transceiver 202 to establish communications with the wireless station 113. This step can represent a request submitted to the wireless station 113 to support a number of communication channels to satisfy the bandwidth requirements of the residences 112.

Once communications have been established, the controller 204 directs in step 308 the cross-connect 206 to redirect by way of its multiplexer the links 111 of the residences 112 affected by the interruption to the wireless transceiver 308. Once this is accomplished, communication services can resume for the affected residences 112 as before. Due to the costly nature of transporting high bandwidth traffic wirelessly, the service provider of the communication system 100 can decide to limit communications in step 310 to emergency services. In this step, emergency services can be provided bilaterally in a first embodiment, or unilaterally in another. Additionally, the wireless station 113 can be an integral part of the emergency response center (such as a public service access point or PSAP). Accordingly, communications between the residences 112 and the PSAP can be point to point.

In the first embodiment, end users at the residences 112 can make emergency calls such as 911 to emergency response centers coupled to the wireless station 113. Similarly, emergency response centers can make calls to residences 112 such as in cases where a broadcast message is submitted to residences 112 to notify end users of an emergency situation (e.g., Tornado warning). In the latter embodiment, only the emergency response centers can contact residences 112 or vice-versa.

In step 312, the controller 204 monitors restoration of service in the communication lines of cable 109. If the outage continues, the controller 204 maintains the backup state of the cross-connect 206 providing services by way of the wireless transceiver 202. If controller 204 detects that services have been restored in step 312, it proceeds to step 314 where it directs the cross-connect 206 to reconnect the affected communication lines of cable 109 to the links 111, thereby restoring communication services by way of the CO 106. In step 316, the controller 204 can be further programmed to deactivate communications between the wireless transceiver 202 and the wireless station 113. Deactivation can represent placing the wireless transceiver 202 in sleep mode rather than a complete shutdown of communications between the wireless transceiver 202 and the wireless station 113.

It would be evident to an artisan with ordinary skill in the art that the aforementioned embodiments can be modified, reduced, or enhanced without departing from the scope and spirit of the claims described below. For example, communication services need not be limited to emergency responses. Accordingly, step 310 can be removed without departing from the scope of the claims. Additionally, the deactivation step 316 can be removed. Instead bandwidth can be reserved for the SAI 110 to perform a rapid backup response to a specific outage. In yet another embodiment, the wireless interface 200 can be located at a remote location from the SAI 110 such as for example the CO 106 or a network element of network 105. In this embodiment, a dedicated communication line can be coupled between the wireless interface 200 and the SAI 110. Consequently, the wireless interface 200 does not have to be an integral component of the SAI 110.

These are but a few examples of modifications that can be applied to the present disclosure. The reader is therefore directed to the claims below for a fuller understanding of the breadth and scope of the present disclosure.

Figure 4:
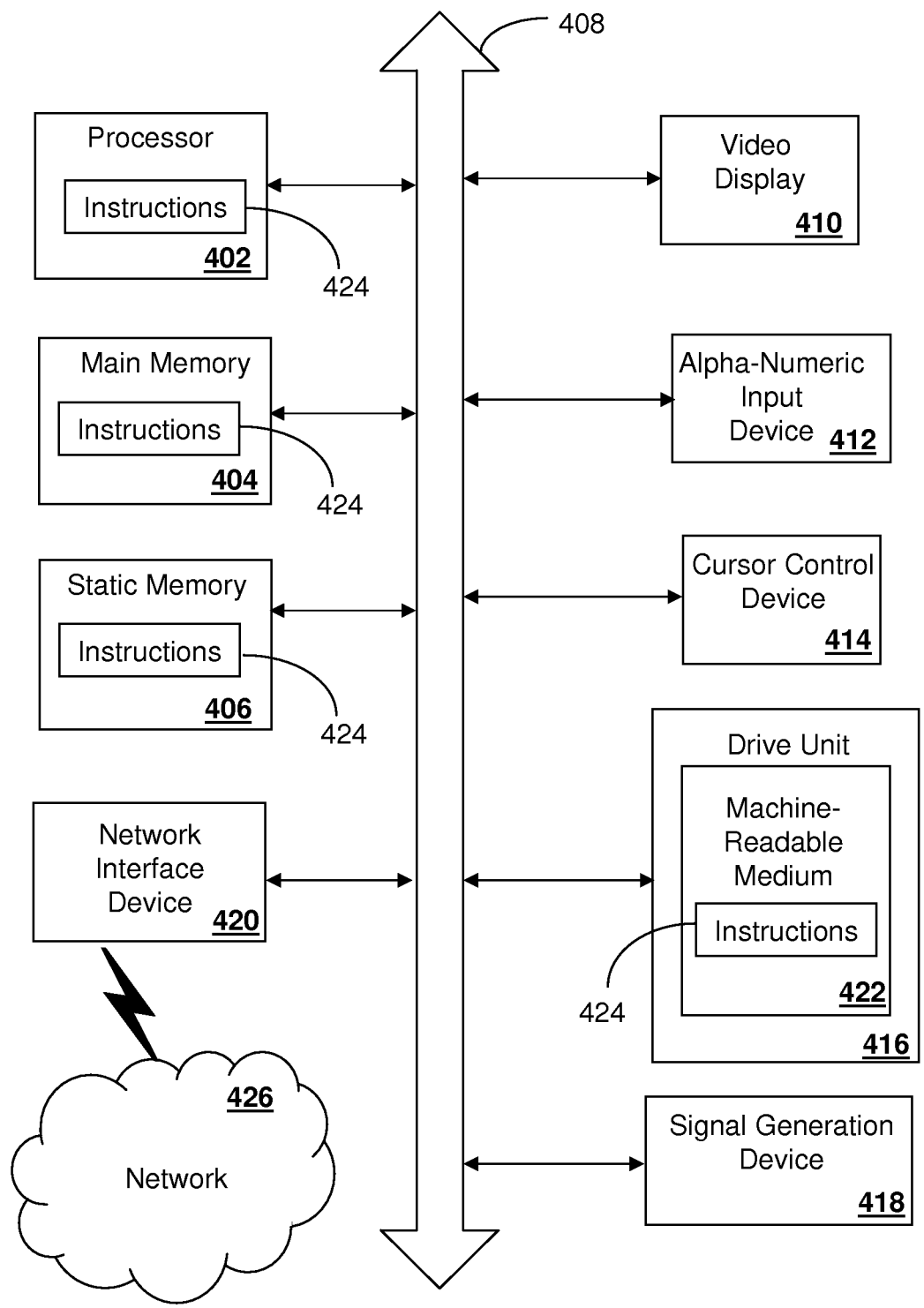
FIG. 4 is a diagrammatic representation of a machine in the form of a computer system within which a set of instructions, when executed, may cause the machine to perform any one or more of the methodologies discussed herein.

FIG. 4 is a diagrammatic representation of a machine in the form of a computer system 400 within which a set of instructions, when executed, may cause the machine to perform any one or more of the methodologies discussed above. In some embodiments, the machine operates as a standalone device. In some embodiments, the machine may be connected (e.g., using a network) to other machines. In a networked deployment, the machine may operate in the capacity of a server or a client user machine in server-client user network environment, or as a peer machine in a peer-to-peer (or distributed) network environment.

The machine may comprise a server computer, a client user computer, a personal computer (PC), a tablet PC, a laptop computer, a desktop computer, a control system, a network router, switch or bridge, or any machine capable of executing a set of instructions (sequential or otherwise) that specify actions to be taken by that machine. It will be understood that a device of the present disclosure includes broadly any electronic device that provides voice, video or data communication. Further, while a single machine is illustrated, the term "machine" shall also be taken to include any collection of machines that individually or jointly execute a set (or multiple sets) of instructions to perform any one or more of the methodologies discussed herein.

The computer system 400 may include a processor 402 (e.g., a central processing unit (CPU), a graphics processing unit (GPU, or both), a main memory 404 and a static memory 406, which communicate with each other via a bus 408. The computer system 400 may further include a video display unit 410 (e.g., a liquid crystal display (LCD), a flat panel, a solid state display, or a cathode ray tube (CRT)). The computer system 400 may include an input device 412 (e.g., a keyboard), a cursor control device 414 (e.g., a mouse), a disk drive unit 416, a signal generation device 418 (e.g., a speaker or remote control) and a network interface device 420.

The disk drive unit 416 may include a machine-readable medium 422 on which is stored one or more sets of instructions (e.g., software 424) embodying any one or more of the methodologies or functions described herein, including those methods illustrated above. The instructions 424 may also reside, completely or at least partially, within the main memory 404, the static memory 406, and/or within the processor 402 during execution thereof by the computer system 400. The main memory 404 and the processor 402 also may constitute machine-readable media.

Dedicated hardware implementations including, but not limited to, application specific integrated circuits, programmable logic arrays and other hardware devices can likewise be constructed to implement the methods described herein. Applications that may include the apparatus and systems of various embodiments broadly include a variety of electronic and computer systems. Some embodiments implement functions in two or more specific interconnected hardware modules or devices with related control and data signals communicated between and through the modules, or as portions of an application-specific integrated circuit. Thus, the example system is applicable to software, firmware, and hardware implementations.

In accordance with various embodiments of the present disclosure, the methods described herein are intended for operation as software programs running on a computer processor. Furthermore, software implementations can include, but not limited to, distributed processing or component/object distributed processing, parallel processing, or virtual machine processing can also be constructed to implement the methods described herein.

The present disclosure contemplates a machine readable medium containing instructions 424, or that which receives and executes instructions 424 from a propagated signal so that a device connected to a network environment 426 can send or receive voice, video or data, and to communicate over the network 426 using the instructions 424. The instructions 424 may further be transmitted or received over a network 426 via the network interface device 420.

While the machine-readable medium 422 is shown in an example embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing, encoding or carrying a set of instructions for execution by the machine and that cause the machine to perform any one or more of the methodologies of the present disclosure.

The term "machine-readable medium" shall accordingly be taken to include, but not be limited to: solid-state memories such as a memory card or other package that houses one or more read-only (non-volatile) memories, random access memories, or other re-writable (volatile) memories; magneto-optical or optical medium such as a disk or tape; and carrier wave signals such as a signal embodying computer instructions in a transmission medium; and/or a digital file attachment to e-mail or other self-contained information archive or set of archives is considered a distribution medium equivalent to a tangible storage medium. Accordingly, the disclosure is considered to include any one or more of a machine-readable medium or a distribution medium, as listed herein and including art-recognized equivalents and successor media, in which the software implementations herein are stored.

Although the present specification describes components and functions implemented in the embodiments with reference to particular standards and protocols, the disclosure is not limited to such standards and protocols. Each of the standards for Internet and other packet switched network transmission (e.g., TCP/IP, UDP/IP, HTML, HTTP) represent examples of the state of the art. Such standards are periodically superseded by faster or more efficient equivalents having essentially the same functions. Accordingly, replacement standards and protocols having the same functions are considered equivalents.

The illustrations of embodiments described herein are intended to provide a general understanding of the structure of various embodiments, and they are not intended to serve as a complete description of all the elements and features of apparatus and systems that might make use of the structures described herein. Many other embodiments will be apparent to those of skill in the art upon reviewing the above description. Other embodiments may be utilized and derived therefrom, such that structural and logical substitutions and changes may be made without departing from the scope of this disclosure. Figures are also merely representational and may not be drawn to scale. Certain proportions thereof may be exaggerated, while others may be minimized. Accordingly, the specification and drawings are to be regarded in an illustrative rather than a restrictive sense.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

The Abstract of the Disclosure is provided to comply with 37 C.F.R. §1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A wireless interface, comprising:
   a memory storing computer instructions;
   a detection device coupled to the memory, wherein the detection device when executing the computer instructions detects a service deficiency in a portion of communication services supplied to a plurality of residences by a central office, wherein the service deficiency is based on a signal-to-noise ratio not meeting a desired threshold without an outage of the portion of the communication services affected by the service deficiency, wherein the central office is coupled over first communication lines to a cross-connect operating in a service area interface, wherein second communication lines connect the plurality of residences with the service area interface;

a monitor device coupled to the memory and the detection device and co-located at the service area interface, wherein the monitor device when executing the computer instructions monitors communications between the central office and the service area interface without monitoring communications between the service area interface and the plurality of residences to detect the service deficiency, wherein the monitored communications are associated with the plurality of residences; and a controller device coupled to the memory, wherein the controller device when executing the computer instructions performs operations comprising:

directing a wireless transceiver to establish communications with a wireless station in response to the detected service deficiency, and directing the cross-connect to provide communication services to a portion of the plurality of residences affected by the detected service deficiency by way of the wireless transceiver to bypass the first communication lines while delivering the communication services to the portion of the plurality of residences over the second communication lines, wherein the detection and controller devices are co-located with the cross-connect at the service area interface, and wherein the service area interface is remotely located from each of the plurality of residences for distributing the communication services to each of the plurality of residences.

2. The wireless interface of claim 1, wherein the monitor device when executing the computer instructions monitors for a restoration associated with the service deficiency.

3. The wireless interface of claim 1, comprising a restoration detection device to detect a restoration of satisfactory operations of the portion of communication services affected by the detected service deficiency, wherein the controller device directs the cross-connect to provide communication services to the portion of the plurality of residences affected by the detected service deficiency by way of the central office.

4. The wireless interface of claim 3, wherein the controller device directs the wireless transceiver to deactivate communications with the wireless station.

5. The wireless interface of claim 1, wherein the controller device restricts communication services to the portion of the plurality of residences affected by the detected service deficiency to emergency services when the wireless transceiver is engaged to supply said communication services.

6. The wireless interface of claim 5, wherein the controller device restricts communication services to emergency broadcast messages supplied by one or more emergency response centers to the portion of the plurality of residences affected by the detected service deficiency.

7. The wireless interface of claim 5, wherein the controller device restricts communication services to emergency requests submitted by the portion of the plurality of residences affected by the detected service deficiency to one or more emergency response centers.

8. The wireless interface of claim 1, wherein the wireless station comprises an emergency response center providing emergency services to the portion of the plurality of residences affected by the detected service deficiency.

9. The wireless interface of claim 1, wherein the cross-connect comprises a multiplexer for coupling communication lines associated with the portion of the plurality of residences affected by the detected service deficiency to the wireless transceiver.

10. A non-transitory computer-readable storage medium in a wireless interface operating in a service area interface, comprising computer instructions which when executed by a processor cause the processor to perform operations comprising:

detecting a service deficiency in a portion of communication services supplied by a central office over first communication lines coupled between a cross-connect of the service area interface and a central office, wherein the service deficiency is based on a bit error rate not meeting a desired threshold without the portion of the communication services affected by the service deficiency being interrupted, wherein the service area interface is coupled with a plurality of establishments over second communication lines, wherein the cross-connect and the service area interface are remotely located from each of the plurality of establishments for distributing the communication services to each of the plurality of establishments; and directing the cross-connect to provide communication services to a portion of the plurality of establishments affected by the service deficiency by way of a wireless transceiver supplying backup communication services by way of a wireless communication system to bypass the first communication lines while delivering the communication services to the portion of the plurality of establishments over the second communication lines.

11. The non-transitory computer-readable storage medium of claim 10, comprising computer instructions for:

detecting a restoration of operations of the portion of communication services affected by the service deficiency;

directing the cross-connect to provide communication services to the portion of the plurality of establishments affected by the service deficiency by way of the central office; and directing the wireless transceiver to deactivate communications with the wireless communication system.

12. The non-transitory computer-readable storage medium of claim 10, comprising computer instructions for restricting communication services to the portion of the plurality of establishments affected by the service deficiency to emergency services when the wireless transceiver is engaged to supply said communication services.

13. The non-transitory computer-readable storage medium of claim 12, comprising computer instructions for restricting communication services to emergency broadcast messages supplied by one or more emergency response centers to the portion of the plurality of establishments affected by the service deficiency.

14. The non-transitory computer-readable storage medium of claim 12, comprising computer instructions for restricting communication services to emergency requests submitted by the portion of the plurality of establishments affected by the service deficiency to one or more emergency response centers.

15. The non-transitory computer-readable storage medium of claim 10, wherein the wireless station comprises an emergency response center providing emergency services to the portion of the plurality of establishments affected by the service deficiency.

16. A service area interface, comprising:

a cross-connect coupled to a central office and a plurality of buildings, wherein the cross-connect is remotely located from each of the plurality of buildings for distributing communication services to each of the plurality of buildings, the cross-connect coupled with the central office via first communication lines, the cross-connect coupled with the plurality of building via second communication lines;

a wireless transceiver coupled to the cross-connect to supply backup communication services by way of a wireless station;

a detection device to detect a service deficiency in the communication services supplied by the central office over the first and second communication lines to the plurality of buildings by way of the cross-connect, wherein the service deficiency is based on a quality of the analog signal not meeting a desired threshold without the communication services affected by the service deficiency being interrupted; and a controller device to:

direct the wireless transceiver to establish communications with the wireless station in response to the interruption, and direct the cross-connect to redirect communications associated with a portion of the plurality of buildings affected by the interruption to the wireless transceiver to bypass the first communication lines while delivering the communications to the portion of the plurality of buildings.

17. The service area interface of claim 16, wherein the controller device:

detects a restoration of operations of the communication services affected by the interruption;

directs the cross-connect to redirect communications associated with the portion of the plurality of buildings affected by the interruption to the central office; and directs the wireless transceiver to deactivate communications with the wireless station.

18. The service area interface of claim 16, wherein the controller device restricts communication services to the portion of the plurality of buildings affected by the interruption to emergency services when the wireless transceiver is engaged to supply said communication services.

19. The service area interface of claim 16, wherein the controller device restricts communication services to emergency broadcast messages supplied by one or more emergency response centers to the portion of the plurality of buildings affected by the interruption when the wireless transceiver is engaged to supply said communication services.

20. The service area interface of claim 16, wherein the controller device restricts communication services to emergency requests submitted by the portion of the plurality of buildings affected by the interruption to one or more emergency response centers when the wireless transceiver is engaged to supply said communication services.

* * * * *